United States Patent Office 2,975,199
Patented Mar. 14, 1961

2,975,199

OLEFIN SELF-ESTERIFICATION

Bernard S. Friedman, Chicago, and Sherwood M. Cotton, Harvey, Ill., assignors to Sinclair Refining Company, New York, N.Y., a corporation of Maine No Drawing. Filed June 2, 1959, Ser. No. 817,448

6 Claims. (Cl. 260—410.9)

This invention is drawn to a new method for the production of "self-esters" from unbranched olefins by reacting them with carbon monoxide in the presence of an HF-water mixture. By a "self-ester" is meant an ester of the type $(R_x)$—COO—R where R is an alkyl or cycloalkyl group derived from the starting olefin. In general, the starting olefin may be of any molecular weight desired and frequently it contains three or more carbon atoms, with 20 carbon atoms being the preferred upper limit. $x$ is usually 1 but if some polymerization, depolymerization or cracking of the olefin occurs, $x$ may be a number greater than one or a fraction. In addition to the ester a substantial quantity of monocarboxylic acid of the formula $(R_x)$COOH can be produced.

Careful control of the amount of water in the HF-water mixture is required in order to maximize the yield of ester. When no water is present in the reaction esters are not produced. The percentage of water in the HF-$H_2O$ catalyst is usually about 1–15%, and this percentage is advantageously maintained throughout the reaction by injection of water as needed. The HF-$H_2O$ catalyst mixture preferably contains about 3 to 10% water, and usually the mole ratio of the sum of the water present at the start plus the water injected to the CO absorbed by the reaction mass is about 0.3 to 3.0 moles water/mole CO, preferably about 1 to 2 moles water/ mole CO.

It should be noted, also, that catalyst mixtures containing the higher percentages of water require higher operating temperatures for the esters to be produced in preference to the acids. The reaction with carbon monoxide can be conducted at a temperature of about 10° to 200° F. or more. The most advantageous temperature to use is dependent on the concentration of HF in the mixture. For example, where the HF-water mixture contains about 5% water, a temperature of about 20 to 150° F. is preferred; about 10% water indicates a preferred temperature of about 50 to 200° F. Also, once the reaction has started it usually is permissible to allow the temperature to fall below that required to initiate the reaction. If an elevated temperature is required it may be attained, for example by the use of a steam coil in the reactor, or any other suitable means may be used. After the reaction is initiated, cold water may be passed through the same coil to take up the heat liberated by the reaction. Agitation usually speeds the reaction.

To avoid polymerization it is best not to allow contact between the olefin and HF without the presence of the carbon monoxide. Therefore, the preferred reaction procedure comprises charging the olefin to a stirred pressure vessel containing the hydrogen fluoride-water mixture and CO at a pressure sufficient to maintain the liquid phase. The reaction may be conducted on a batchwise or continuous basis. In the latter instance, countercurrent contact between the CO and the olefin-catalyst mixture is advantageous.

The HF is present in the reaction mixture in the proportion of about 2 to 20 moles HF to 1 mole of olefin, preferably about 2 to 5 moles HF per mole of olefin. The CO partial pressure is preferably above 100 p.s.i.g. but may be between 1 atmosphere and 1000 p.s.i.g. The CO reacts in the proportion of one mole CO for each two moles of olefin, but an excess of CO can be used to insure conversion of the olefin to ester with a minimum of undesired side reactions, such as polymerization and cleavage. The CO may be mixed with an inert gas, such as hydrogen, carbon dioxide or $CH_4$ if desired.

The reaction is usually complete in one minute to 1 hour. This completion can be signalled by a halt in the fall of the CO pressure. Agitation is discontinued, the remaining CO is released and the contents of the reactor are treated with water. The ester, along with the HF and some excess water, is discharged to fractionation. The hydrogen fluoride, containing some entrained water, is vaporized and collected for recycle. Since the HF-$H_2O$ mixture separated by fractional distillation from the ester product generally contains about 15 to 30% water, the proportions are adjusted by adding more HF or removing some water from the mixture before recycle to the CO reaction. Any olefin that remains unreacted can also be recovered and may be recycled. Alternatively, the reactor contents may be treated with an alcohol to convert any acyl fluoride present in the reaction product to an ester, following which the mixture is fractionated, or washed with water, then alkali to remove acids.

The following examples are intended to be illustrative only and not limiting.

EXAMPLES

A series of reactions were run in a 2-liter autoclave equipped with a magnetically drawn plunger-type stirrer. In blank run 18 anhydrous HF was placed in the autoclave; in the other runs, a mixture of HF containing the percentage of water recited in the table below was placed in the autoclave. Then CO was charged to the autoclave. The recited olefin was added gradually to the agitated reaction vessel, and agitation was continued for an additional period until the CO pressure of the vessel stopped falling. In runs 22, 39 and 49 water was added during the reaction to maintain the initial catalyst concentration. The figures recited in the table for these runs are the average water content of the catalyst. The products were discharged into a polyethylene bottle containing crushed ice, an organic layer gradually separating from the water-HF layer. After washing with water, the organic layer was dried over anhydrous sodium sulfate and analyzed by infra-red. Then this was reacted with a 10% aqueous KOH solution to isolate the esters from the organic acids, which were analyzed by distillation and vapor phase chromatography.

The following table shows the conditions and results of these runs. The absorption of CO was estimated from the gain in weight of the liquid products.

Table 1

| Run | Kind | Olefin | | | | CO | |
|---|---|---|---|---|---|---|---|
| | | Grams | Moles | Time (minutes) | | Pressure Range (p.s.i.g.) | Grams [a] | Moles [a] |
| | | | | To Add | Cont'd Stirring | | | |
| (18) | Butene-1 | 198 | 3.54 | 39 | 30 | 580–410 | 40 | 1.43 |
| (34) | do | 165 | 2.95 | 90 | 70 | 540–385 | 40 | 1.45 |
| (23) | do | 284 | 3.01 | 39 | 37 | 430–290 | 39 | 1.39 |
| (19) | do | 198 | 3.54 | 90 | 185 | 635–320 | 56 | 2 |
| (22) | do | 159 | 2.84 | 34 | 31 | 550–435 | 32 | 1.14 |
| (39) | do | 166 | 2.97 | 120 | 50 | 425–370 | 26.5 | 0.95 |
| (49) | Octene-1 | 324 | 2.9 | 100 | 10 | 490–365 | 46 | 1.64 |
| (53) | Diisobutylene | 710 | 6.33 | 143 | 10 | 500–70 | 142 | 5.08 |
| (36) | Propylene Tetramer | 487 | 2.9 | 77 | 49 | 485–320 | 100 | 3.57 |

[a] Absorbed.

| Run | Ratio CO/Olefin | HF | | Water | | | Temp. (max.) °F. |
|---|---|---|---|---|---|---|---|
| | | Grams | Moles | Grams | Moles | Wt. Percent in Catalyst | |
| (18) | 0.42 | 245 | 12.25 | none | none | none | 85 |
| (34) | 0.48 | 211 | 10.55 | [1] 11 | 0.61 | 5 | 85 |
| (23) | 0.46 | 247 | 12.35 | [1] 28 | 1.55 | 10.2 | 135 |
| (19) | 0.57 | 259 | 13 | [1] 110.5 | 6.14 | 29.9 | 211 |
| (22) | 0.4 | 265 | 13.25 | [1] 8, [2] 25 | 1.4 | 3 | 80 |
| (39) | 0.32 | 216 | 10.8 | [1] 11, [2] 29 | 1.61 | 5 | 85 |
| (49) | 0.57 | 213 | 10.65 | [1] 11, [2] 35 | 1.94 | 5 | 85 |
| (53) | 0.8 | 280 | 14 | [1] 30 | 1.66 | 9.7 | 70 |
| (36) | 1.23 | 216 | 10.8 | [1] 12 | 0.66 | 5.3 | 85 |

[1] Initially present with HF.
[2] Total.

| Run | Product Esters | | | | | | Product Acids | |
|---|---|---|---|---|---|---|---|---|
| | Kind | Grams | Moles | Kind | Grams | Moles | Wt. Percent Total Product | Grams | Wt. Percent Total Product |
| (18) | none | none | none | none | none | none | none | [7] 238 | 100 |
| (34) | sec-butyl-2-methylbutanoate.[3] | 48 | 0.31 | sec-butyl isononate.[5] | 22 | 0.11 | 35 | 128 | 65 |
| (23) | do.[3] | 33 | | higher | 14 | | 22 | 166 | 78 |
| (19) | none | none | none | none | none | none | none | 288 | 100 |
| (22) | sec-butyl-2-methylbutanoate. | 80 | | higher | 10 | | 49 | 93 | 51 |
| (39) | do | 102 | 0.65 | sec-butyl isononate. | 72 | 0.34 | [6] 79 | | [6] 21 |
| (49) | sec-octyl isononates.[4] | 123 | 0.46 | higher | 27 | | 45 | 182 | 55 |
| (53) | none | none | none | none | none | none | none | [8] 785 | 100 |
| (36) | none | none | none | none | none | none | none | [9] 661 | 100 |

[3] B.P. 168° C. $n^{20}$ 1.4039–1.4043.
[4] B.P. 275–302° C. $n^{20}$ 1.4333–1.4342.
[5] B.P. 250° C. $n^{20}$ 1.4300.
[6] Mole percent.
[7] Including 2-methylbutanoic, $C_9$ and higher acids.
[8] Including pivalic, $C_9$, $C_{13}$ and higher acids.
[9] Including $C_5$–$C_9$, $C_{13}$ and higher acids.

These results show that when water is not present in the HF within the specified range, no esters are produced, and also show that the process is ineffective on branched olefins.

In another experiment cyclohexene was utilized as the unbranched olefin. On treatment under conditions specified above in run 39 for butene-1, cyclohexene was found to absorb 0.38 mole of CO per mole of olefin. The final product consisted of 1.44 moles (48% theory) of organic acid, mainly cyclohexanecarboxylic acid, and 0.5 mole (33% theory) of ester, mainly cyclohexyl cyclohexane-carboxylate.

We claim:

1. A method for the production of self-esters which comprises reacting an unbranched monoolefin and carbon monoxide in the presence of an HF-water mixture containing at least about two moles of HF per mole of olefin and about 1 to 15% water at a temperature of about 10 to 200° F. and a pressure sufficient to maintain the liquid phase.

2. The process of claim 1 where the hydrogen fluoride is present in an amount of about 2–5 moles per mole of olefin.

3. The process of claim 1 in which the olefin is one having 3 to 20 carbon atoms.

4. The process of claim 1 where the water is present in the range of about 3 to 10% of the HF-water mixture.

5. The process of claim 1 in which the HF is present in the amount of about 2 to 20 moles per mole of olefin.

6. A method for the production of self-esters which comprises reacting an unbranched monoolefin of 3 to 20 carbon atoms and carbon monoxide in the presence of an HF-water mixture containing about 2–5 moles of HF per mole of olefin and about 3 to 10% water at a temperature of about 10 to 200° F. and a pressure sufficient to maintain the liquid phase.

No references cited.